US009510258B1

(12) United States Patent
Chaudhuri et al.

(10) Patent No.: US 9,510,258 B1
(45) Date of Patent: Nov. 29, 2016

(54) METHOD AND SYSTEM FOR PERFORMING A HANDOVER IN A WIRELESS BROADBAND NETWORK

(71) Applicant: Wipro Limited, Bangalore (IN)

(72) Inventors: Saptarshi Chaudhuri, Bangalore (IN); Irfan Baig, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/845,571

(22) Filed: Sep. 4, 2015

(30) Foreign Application Priority Data

Jul. 20, 2015 (IN) .......................... 3715/CHE/2015

(51) Int. Cl.
*H04W 36/30* (2009.01)
*H04W 36/24* (2009.01)

(52) U.S. Cl.
CPC .................................... *H04W 36/24* (2013.01)

(58) Field of Classification Search
CPC .. H04W 36/245; H04W 36/00; H04W 36/32
USPC .......... 455/436–439, 442–444, 115.1, 115.3, 455/134, 135, 226.1–226.2, 513; 370/331–332
See application file for complete search history.

(56) References Cited

U.S. PATENT DOCUMENTS

| 8,886,197 | B2 | 11/2014 | Lindoff et al. | |
| 2013/0021929 | A1* | 1/2013 | Kim | H04B 7/024 370/252 |
| 2013/0242941 | A1* | 9/2013 | Ebesu | H04W 36/245 370/331 |
| 2014/0086123 | A1* | 3/2014 | Deivasigamani | H04W 76/048 370/311 |
| 2014/0194121 | A1 | 7/2014 | Lindoff et al. | |
| 2015/0011224 | A1 | 1/2015 | Kompalli Chakravartula et al. | |
| 2015/0045040 | A1 | 2/2015 | Lai et al. | |
| 2015/0201360 | A1* | 7/2015 | Ray Chaudhuri | H04W 36/30 455/436 |

OTHER PUBLICATIONS

3rd Generation Partnership Project, "3rd Generational Partnership Project; Technical Specification Group Radio Access Network; Evolved Universal Terrestrial Radio Access (E-UTRA); Medium Access Control (MAC) Protocol Specification", Technical Specification, Mar. 2012, V8 12.0, 3GPP Organizational Partners, Valboone, France.
3rd Generation Partnership Project, "3rd Generational Partnership Project; Technical Specification Group Services and Systems Aspects; General Packet Radio Service (GPRS) Enhancements for Evolved Universal Terrestrial Radio Access Network (E-UTRAN) Access", Technical Specification, Mar. 2012, V8 16.0, 3GPP Organizational Partners, Valboone, France.

(Continued)

*Primary Examiner* — Cong Tran
(74) *Attorney, Agent, or Firm* — LeClairRyan, a Professional Corporation

(57) ABSTRACT

A method and system for performing a handover in a wireless broadband network is disclosed. The method comprises receiving, measurement reports from one or more User Equipment (UE) associated with a serving base station (BS); determining occurrence of one or more handover event types based on the one or more measurement reports; counting a number of occurrences of each of the one or more handover event types within a predefined period; determining a consistency count for each of the one or more handover event types based on the number of occurrences of the one or more handover event types; and performing a handover based on a comparison between the consistency count for each of the one or more handover event types and associated threshold consistency counts for the one or more handover event types.

18 Claims, 4 Drawing Sheets

(56) References Cited

OTHER PUBLICATIONS

3rd Generation Partnership Project, "3rd Generational Partnership Project; Technical Specification Group Radio Access Network; Evolved Universal Terrestrial Radio Access (E-UTRA); Physical Channels and Modulation", Technical Specification, Feb. 2013, V10 7.0, 3GPP Organizational Partners, Valboone, France.

3rd Generation Partnership Project, "3rd Generational Partnership Project; Technical Specification Group Radio Access Network; Evolved Universal Terrestrial Radio Access (E-UTRA); Multiplexing and Channel Coding", Technical Specification, Jun. 2013, V10 8.0, 3GPP Organizational Partners, Valboone, France.

3rd Generation Partnership Project, 3rd Generational Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2, Technical Specification, Sep. 2013, V10 11.0, 3GPP Organizational Partners, Valboone, France.

3rd Generation Partnership Project, "3rd Generational Partnership Project; Technical Specification Group Radio Access Network; Evolved Universal Terrestrial Radio Access (E-UTRA); Physical Layer Procedures", Technical Specification, Mar. 2014, V10 12.0, 3GPP Organizational Partners, Valboone, France.

3rd Generation Partnership Project, "3rd Generational Partnership Project; Technical Specification Group Radio Access Network; Evolved Universal Terrestrial Radio Access (E-UTRAN); Radio Resource Control (RRC); Protocol Specification", Technical Specification, Jun. 2012, V8 17.0, 3GPP Organizational Partners, Valboone, France.

\* cited by examiner

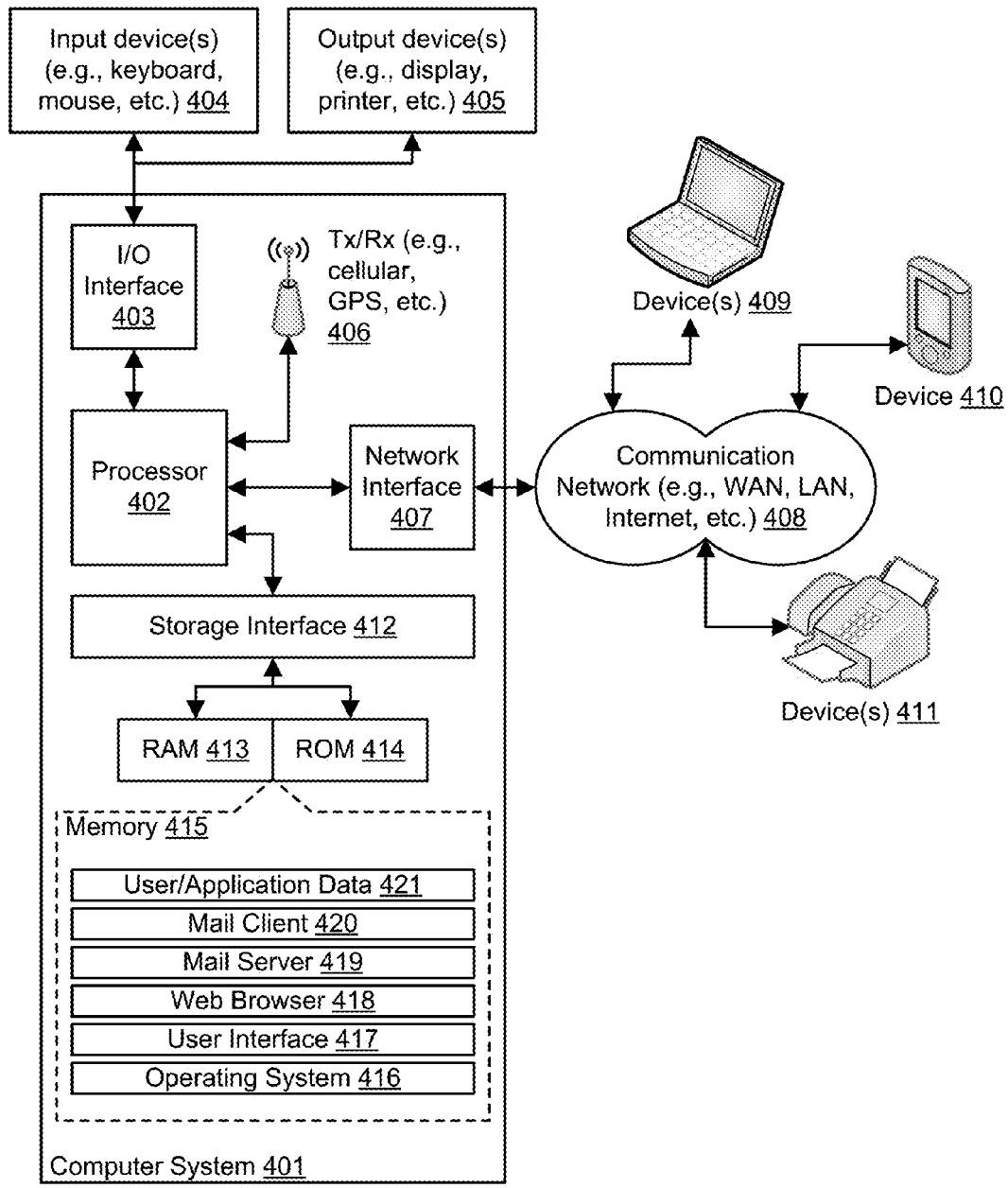
FIG. 4: Example Computer System

US 9,510,258 B1

METHOD AND SYSTEM FOR PERFORMING A HANDOVER IN A WIRELESS BROADBAND NETWORK

This application claims the benefit of an Indian Patent Application Serial No. 3715/CHE/2015, filed Jul. 20, 2015; which is hereby incorporated by reference in its entirety.

FIELD

This disclosure relates generally to wireless broadband networks, and more particularly to a method and system for performing a handover in a wireless broadband network.

BACKGROUND

Handover (HO) is an integral procedure in cellular networks that guarantees users mobility across sectors of a base station and between base stations. One of the main input for HO is the measurement reports from the User Equipment (UEs). Typical measurement reports may include the signal strengths of serving base stations and those of neighbor base stations. One of the main parameters of the UEs measurement report is the Reference Signal Received Power (RSRP) of the serving and configured neighbor base stations along with the reported HO events. A handover triggering mechanism may analyze the above parameters and decide whether to perform a handover or not.

With higher speed of movement of UEs, there may be significant variations in the RSRP values reported by the UE over a period of time (within few milliseconds). Existing HO detection mechanisms may not be able to take into consideration the higher variation of RSRP values as reported (by UE in motion) within the available short-period-of-time for such determination, causing unnecessary or frequent handovers failures leading to call drop. Also, due to high speed movement of UEs, most of the serving cells may fail to conclude on the HO decision within few milliseconds and during this time the UEs may move out of the serving cell coverage area with HO leading to call drop.

SUMMARY

In one embodiment, a method of performing a handover in a wireless broadband network is disclosed. The method comprises: receiving, one or more measurement reports from one or more User Equipment (UE) associated with a serving base station (BS), wherein the one or more measurement reports comprise Reference Signal Received Power (RSRP) values of the serving BS and one or more neighbor BSs; determining occurrence of one or more handover event types based on the one or more measurement reports; counting a number of occurrences of each of the one or more handover event types within a predefined period; determining, by a handover event analysis device, a consistency count for each of the one or more handover event types based on the number of occurrences of the one or more handover event types; and performing a handover based on a comparison between the consistency count for each of the one or more handover event types and associated threshold consistency counts for the one or more handover event types.

In another embodiment, a handover event analysis device for performing a handover in a wireless broadband network is disclosed. The handover event analysis device comprises a processor; and a memory communicatively coupled to the processor, wherein the memory stores processor-executable instructions, which, on execution, cause the processor to: receive one or more measurement reports from one or more User Equipment (UE) associated with a serving base station (BS), wherein the one or more measurement reports comprise Reference Signal Received Power (RSRP) values of the serving BS and one or more neighbor BSs; determine occurrence of one or more handover event types based on the one or more measurement reports; count a number of occurrences of each of the one or more handover event types within a predefined period; determine a consistency count for each of the one or more handover event types based on the number of occurrences of the one or more handover event types; and perform a handover based on a comparison between the consistency count for each of the one or more handover event types and associated threshold consistency counts for the one or more handover event types.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
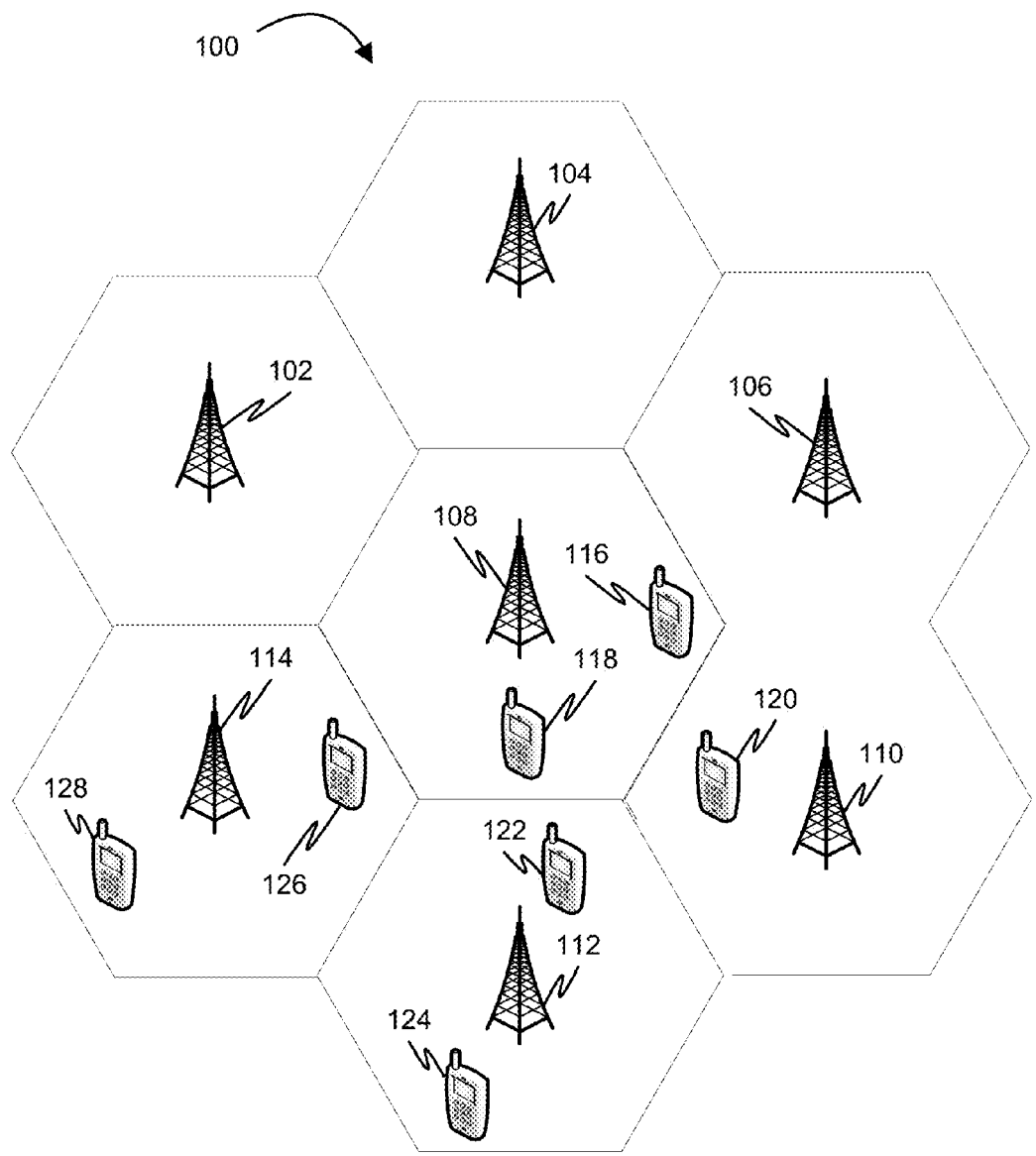
FIG. 1 illustrates an exemplary high level network depicting a wireless broadband network architecture in which various embodiments of the invention may function.

An exemplary high level network 100 depicting a wireless broadband network architecture in which various embodiments of the invention may function is illustrated in FIG. 1. Network 100 may include, but is not limited to, cellular networks such as Global System for Mobile Communications (GSM), Code Division Multiple Access (CDMA), third generation (3G) network, and Long Term Evolution (LTE) network. Mobile communication network 100 may include one or more Base Stations (BSs) such as BSs 102-114 and one or more Mobile Stations (MSs) such as MSs 116-128.

At a given point in time a MS may be in wireless communication with a single BS. In other words, the MS may be served by a single BS. This BS is typically called the serving BS. The serving BS provides a link between the MS and the wider mobile network. For example, in FIG. 1, BS 108 may be the serving BS for the MS 116 and the MS 118. Similarly, BS 110 may be the serving BS for the MS 120. Each BS may be associated with a range, wherein the range of a BS corresponds to the area to which the BS can transmit wireless signals. Thus, each BS may be the serving BS for a number of MSs lying within the transmitting range of the BS.

When an MS moves from the serving area of one BS to the serving area of another BS, a handover or handoff process may be initiated to provide an unbroken connection to the MS. A handover process typically involves transferring a call from a serving BS to one of the neighbor BSs depending on the direction of motion of the MS. For example, if MS 118 moves away from serving BS 108 towards BS 110, then BS 108 may handover MS 118 to BS 110. BS 110 then becomes the serving BS for MS 118 and provides the link between MS 118 and the wider communication network.

In order to determine which neighbor BS to handover a MS to, the serving BS maintains a neighbor list of all neighbors accessible to the MS and also the signal strength between the MS and each one of the neighbors accessible to the MS. A neighbor list is maintained by the serving BS for each MS being served by the serving BS. To populate the neighbor list, the serving BS may instruct a MS currently being served by the serving BS to periodically report signal strength measurements between itself and each neighbor BS from which it receives a signal. This may be called neighbor reporting. In addition to reporting about its neighbors, each MS may also report signal strength between itself and the current serving BS. Neighbor reporting usually involves each MS transmitting a measurement report comprising signal strength measurements between it and neighboring BSs from which the MS receives a signal. For example, MS 116 may be able to receive a signal from BS 106 and BS 110 based on the proximity between MS 116 and each of BS 106 and BS 110 and may not receive a signal from BS 102, BS 104, BS 112, and BS 114. Thus, BS 106 and BS 110 may be considered neighbor BSs relative to MS 116. MS 116 may report the signal strength between MS 116 and each of BS 106 and BS 110 to current serving BS 108. Serving BS 108 may use the measurement reports provided by MS 116 to determine a potential neighbor to which MS 116 is to be handed over.

The measurement reports provided by a MS to the serving BS may enable the serving BS to determine a direction of motion of the MS and accordingly a potential neighbor to which the MS is to be handed over. For example, if MS 118 moves from the serving area of BS 108 towards BS 104, the signal strength measurements between MS 118 and each of BSs 108, 110, 112, and 114 may decrease while at the same time the signal strength measurements between MS 118 and each of BSs 102, 104, and 106 may increase. By analyzing these measurements, BS 108 may determine an appropriate neighbor to which the MS 118 can be handed over and accordingly proceed with the handover.

Figure 2:
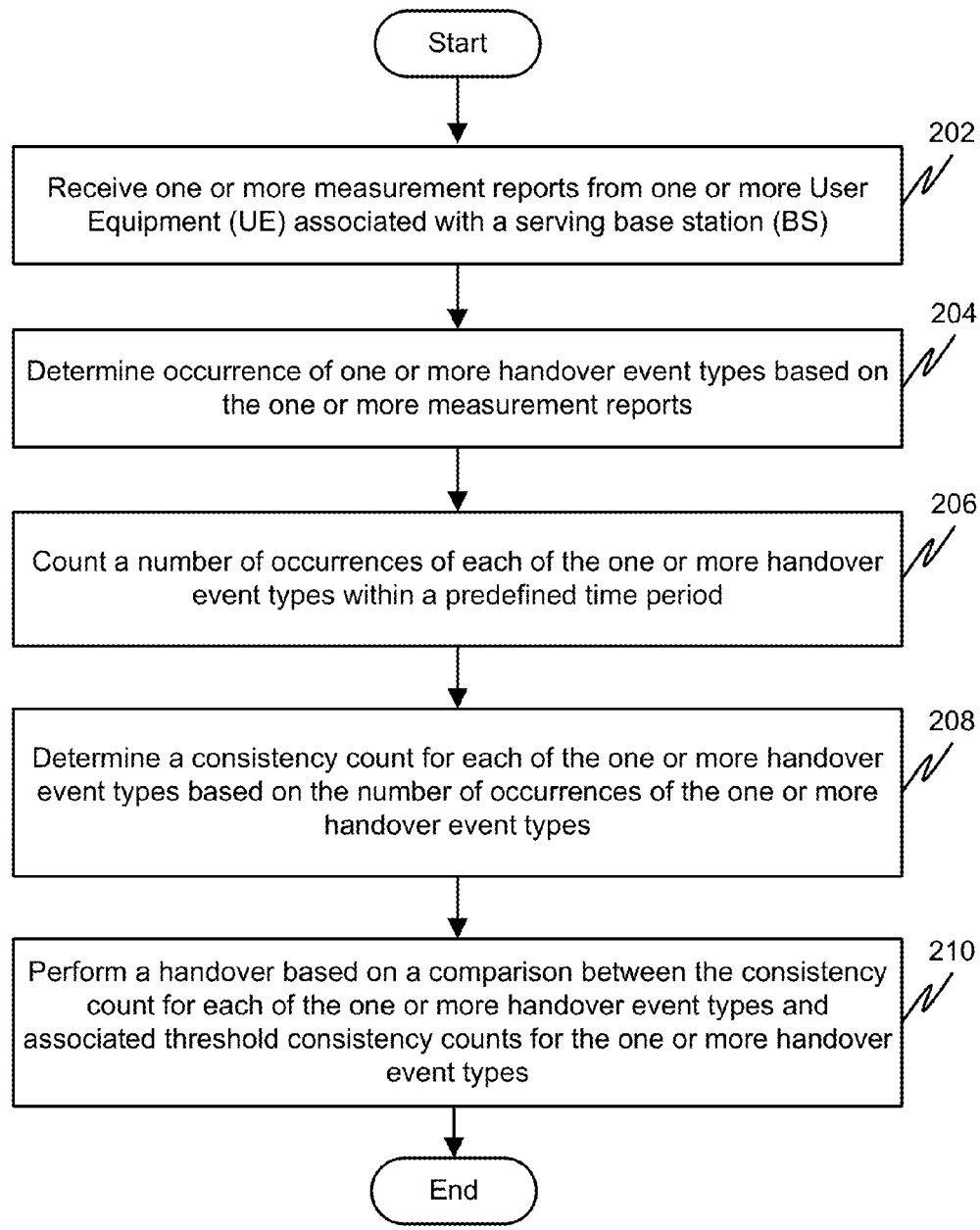
FIG. 2 illustrates a flow chart of a method of performing a handover in a wireless broadband network in accordance with some embodiments of the present disclosure.

A method of performing a handover in a wireless broadband network in accordance with some embodiments of the invention will now be explained with reference to FIG. 2. The method involves, receiving, by a handover event analysis device, one or more measurement reports (hereinafter referred as "measurement reports") from one or more User Equipment (UE) associated with a serving base station (BS) at step 202. The measurement reports may include Reference Signal Received Power (RSRP) values of the serving BS and one or more neighbor BSs. Receiving the measurement reports from the UEs is described in detail in conjunction with FIG. 1. On receiving the measurement reports from the UEs, occurrence of one or more handover event types (hereinafter referred as "handover event types") may be determined based on the one or more measurement reports at step 204. The handover event types may be associated with a standard governing the broadband network. For example, in a third generation (3G) network, the occurrence of handover event types may be determined based on 3rd Generation Partnership Project (3GPP) specification. The handover event types may specify when and where a handover needs to be performed as per the 3GPP specification. For instance, a first handover event type may be considered to have occurred if the RSRP value of the serving BS deteriorates to a value below a predefined threshold. A second handover event type may be considered to have occurred if a neighbor RSRP value becomes offset better than the RSRP value of the serving BS. Offset here means greater or lesser than some "factor" and is defined by the standard. Further, a third handover event type may be considered to have occurred if a neighbor RSRP value becomes better than a threshold.

The number of times each of the handover event types occur in a predefined time period may be counted at step 206. The occurrence of the handover event types for each UE served by the serving BS may be counted. For those handover event types dependent of a neighbor RSRP value, each neighbor in a neighbor list may be considered to determine if the handover event type has occurred. An event counter may be used to count the number of occurrences of the handover event types. For example, a first counter may count the number of occurrences of the first handover event type, a second counter may count the number of occurrences of the second handover type and so on.

At step 208, a consistency count for each of the handover event types may be determined based on the number of occurrences of the one or more handover event types. The consistency count for a handover event type indicates the consistency with which that handover event type occurs over a period of time. In some embodiments, the consistency count for a handover event type may be determined when number of occurrences of the handover event type crosses a predefined threshold. This may remove transient events which occur randomly from consideration. The consistency count for a first handover event type may be determined independent of the consistency count for a second handover event type. In keeping with the earlier example wherein the first handover event type involves the RSRP value of the serving BS deteriorating to a value below a predefined threshold, the consistency count for this first handover event type may be incremented if the sum of the difference between a serving BS current RSRP value and serving BS previous RSRP value and an event type RSRP difference hysteresis is less than a predefined first handover event type RSRP difference threshold. That is:

if ((RSRP_serving_current−RSRP_serving_prev)+ Event1_RSRP_difference_hyst)<Event1_ RSRP_difference_th
Event1_consistency_count=Event1_consistency_ count+1

Similarly, the consistency count for the second handover event type may be computed based on:

if ((RSRP_neighbor−RSRP_serving)− Event2_RSRP_difference_hyst)>Event2_ RSRP_difference_th Event2_consistency_ count=Event2_consistency_count+1

The consistency count for the third handover event type may be computed based on:
  if ((RSRP_neighbor_current−RSRP_neighbor_prev)−Event3 RSRP_difference_hyst)>Event3 RSRP_difference_th   Event3_consistency_count=Event3_consistency_count+1

Once the consistency counts are determined for each of the handover event types, the consistency counts may be compared with predefined associated threshold consistency counts for the one or more handover event types. Each handover event type may be associated with a corresponding threshold consistency count. On comparing the consistency counts with the associated thresholds, the severity of the handover may be determined. The severity in this case may indicate how quickly the UE needs to be handed over. For example,
  if (Event1_consistency_count>Event1_consistency_count_th) and (Event2_consistency_count>Event2_consistency_count_th) and (Event3_consistency_count>Event3_consistency_count_th), then a quick handover process may be initiated and the UE may be handed over early.

In another instance, if:
  (Event1_consistency_count>Event1_consistency_count_th) and (Event2_consistency_count<Event2_consistency_count_th) and (Event3_consistency_count>Event3_consistency_count_th), then the action that may be taken is to monitor event2 and perform a late handover.

Similarly, the following actions may be performed based on the consistency counts of the handover event types.
  If (Event1_consistency_count>Event1_consistency_count_th) and (Event2_consistency_count<Event2_consistency_count_th) and (Event3_consistency_count<Event3_consistency_count_th), then Event2 and Event3 events may be monitored to find the neighbor and perform a late handover.

If (Event1_consistency_count<Event1_consistency_count_th) and (Event2_consistency_count<Event2_consistency_count_th) and (Event3_consistency_count<Event3_consistency_count_th), then all the UE counters may be flushed and the process started over.

If (Event1_consistency_count<Event1_consistency_count_th) and (Event2_consistency_count>Event2_consistency_count_th) and (Event3_consistency_count<Event3_consistency_count_th), then all the UE counters may be flushed and the process started over.

If (Event1_consistency_count<Event1_consistency_count_th) and (Event2_consistency_count>Event2_consistency_count_th) and (Event3_consistency_count>Event3_consistency_count_th), then a quick handover process may be started.

If (Event1_consistency_count<Event1_consistency_count_th) and (Event2_consistency_count<Event2_consistency_count_th) and (Event3_consistency_count>Event3_consistency_count_th), then all the UE counters may be flushed and the process started over.

If (Event1_consistency_count>Event1_consistency_count_th) and (Event2_consistency_count>Event2_consistency_count_th) and (Event3_consistency_count<Event3_consistency_count_th), then a quick handover process may be started.

Thus, a handover may be performed at step 210 based on the comparison between the consistency count for each of the one or more handover event types and associated threshold consistency counts for the one or more handover event types. In order to perform the handover, a target neighbor to which the UE is to be handed over may be determined. The target neighbor may be determined based on a neighbor weight (N_wt) determined for each neighbor wherein the weight is based on the handover event types' consistency counts.

$$N\_wt = Event1\_consistency\_count * alpha + Event2\_consistency\_count * beta + Event3\_consistency\_count * gamma$$

where alpha, beta and gamma are predefined weights associated with a first handover event type, a second handover event type and a third handover event type respectively. The weights alpha, beta and gamma indicate the importance or the significance assigned to the first event, the second event, and the third event when determining the overall weight for a neighbor.

On determining the N_wt for each neighbor, the neighbor having the highest N_wt may be selected as the target neighbor to which the UE is to be handed over. In case two or more neighbors have the same weight then the target may be selected randomly from the two or more neighbors.

Figure 3:
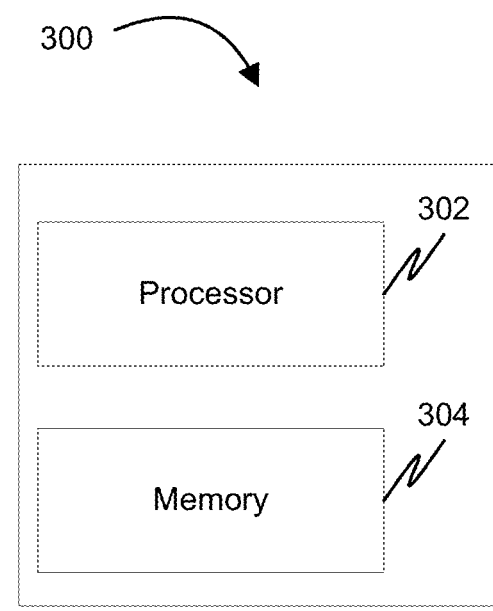
FIG. 3 illustrates a block diagram of a handover event analysis device in accordance with some embodiments of the present disclosure.

A handover event analysis device 300 will now be explained in conjunction with FIG. 3. The handover event analysis device 300 may comprise a processor 302 and a memory 304 communicatively coupled to processor 302. Memory 304 may store processor-executable instructions, which, on execution, cause the processor 302 to receive one or more measurement reports from one or more User Equipment (UE) associated with a serving base station (BS). The one or more measurement reports (hereinafter referred to as measurement reports) comprise Reference Signal Received Power (RSRP) values of the serving BS and one or more neighbor BSs. Receiving the measurement reports from the UEs is described in detail in conjunction with FIG. 1. On receiving the measurement reports from the UEs, processor 302 may determine an occurrence of one or more handover event types (hereinafter referred as "handover event types") based on the measurement reports. The handover event types may be associated with a standard governing the broadband network. For example, in a third generation (3G) network, the occurrence of handover event types may be determined based on 3rd Generation Partnership Project (3GPP) specification. The handover event types may specify when and where a handover needs to be performed as per the 3GPP specification. For instance, a first handover event type may be considered to have occurred if the RSRP value of the serving BS deteriorates to a value below a predefined threshold. A second handover event type may be considered to have occurred if a neighbor RSRP value becomes offset better than the RSRP value of the serving BS. Further, a third handover event type may be considered to have occurred if a neighbor RSRP value becomes better than a threshold.

Processor 302 may further count the number of times each of the handover event types occur in a predefined time period. The occurrence of the handover event types for each UE served by the serving BS may be counted. For those handover event types dependent of a neighbor RSRP value, each neighbor in a neighbor list may be considered to determine if the handover event type has occurred. In some embodiments, an event counter may be used to count the number of occurrences of the handover event types. On determining the number of occurrences of each handover event type, processor 302 may determine a consistency count for each of the handover event types based on the number of occurrences of the one or more handover event types. The consistency count for a handover event type indicates the consistency with which that handover event type occurs over a period of time. In some embodiments, the consistency count for a handover event type may be determined when number of occurrences of the handover event type crosses a predefined threshold. Determining the consistency count for each of the handover event types is explained in detail in conjunction with FIG. 2.

Once the consistency counts are determined for each of the handover event types, processor 302 may compare the consistency counts with predefined associated threshold consistency counts for the one or more handover event types. Each handover event type may be associated with a corresponding threshold consistency count. On comparing the consistency counts with the associated thresholds, the severity of the handover may be determined. The severity in this case may indicate how quickly the UE needs to be handed over. Based on the severity, processor 302 may perform one or more actions as explained in conjunction with FIG. 2.

Thus, a handover may be performed based on the comparison between the consistency count for each of the one or more handover event types and associated threshold consistency counts for the one or more handover event types. In order to perform the handover, processor 302 may determine a target neighbor to which the UE is to be handed over. The target neighbor may be determined based on a neighbor weight (N_wt) determined for each neighbor wherein the weight is based on the handover event types' consistency counts.

$$N\_wt=Event1\_consistency\_count*alpha+ \\ Event2\_consistency\_count*beta+ \\ Event3\_consistency\_count*gamma$$

where alpha, beta and gamma are predefined weights associated with a first handover event type, a second handover event type and a third handover event type respectively. The weights alpha, beta and gamma indicate the importance or the significance assigned to the first event, the second event, and the third event when determining the overall weight for a neighbor.

On determining the N_wt for each neighbor, the neighbor having the highest N_wt may be selected as the target neighbor to which the UE is to be handed over. In case two or more neighbors have the same weight then the target may be selected randomly from the two or more neighbors.

Computer System

FIG. 4 is a block diagram of an exemplary computer system for implementing embodiments consistent with the present disclosure. Variations of computer system 401 may be used for implementing handover event analysis device 300. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and a system for performing a handover. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of performing a handover in a wireless broadband network, the method comprising:
receiving, by a handover event analysis device, one or more measurement reports from one or more User Equipment (UE) associated with a serving base station (BS), wherein the one or more measurement reports comprise Reference Signal Received Power (RSRP) values of the serving BS and one or more neighbor BSs;

determining, by the handover event analysis device, occurrence of one or more handover event types based on the one or more measurement reports, a number of occurrences of each of the one or more handover event types within a predefined time period, and a consistency count for each of the one or more handover event types based on the number of occurrences of the one or more handover event types and RSRP values of at least one of the serving BS and the one or more neighbor BSs; and performing, by the handover event analysis device, a handover based on a comparison between the consistency count for each of the one or more handover event types and associated threshold consistency counts for the one or more handover event types.

2. The method of claim 1, wherein the occurrence of the one or more handover event types is determined based on a 3rd Generation Partnership Project (3GPP) specification.

3. The method of claim 1, wherein the consistency count for the one or more handover event types is determined based on at least one of a serving BS current RSRP value, the serving BS previous RSRP value, an event type RSRP difference hysteresis, and an event type RSRP difference threshold.

4. The method of claim 1, wherein the consistency count for the one or more handover event types is determined:
based on one or more RSRP values of the one or more neighbor base stations, an RSRP value of the serving BS, an event type RSRP difference hysteresis, and an event type RSRP difference threshold; and
when the number of occurrences of each of the one or more handover event types exceeds an associated threshold count.

5. The method of claim 1, further comprising determining, by the handover event analysis device, a handover severity based on the comparison between the consistency count for each of the one or more handover event types and associated threshold consistency counts for the one or more handover event types.

6. The method of claim 1, further comprising:
computing, by the handover event analysis device, a weight factor for each of the one or more neighbor BSs based on a weighted sum of the consistency counts for each of the one or more handover event types associated with each of the one or more neighbor BSs; and
identifying, by the handover event analysis device, a target neighbor BS for handover based on the weight factor associated with the one or more neighbor BSs.

7. A handover event analysis device, comprising:
a processor; and
a memory communicatively coupled to the processor, wherein the memory stores processor-executable instructions, which, on execution, cause the processor to:
receive one or more measurement reports from one or more User Equipment (UE) associated with a serving base station (BS), wherein the one or more measurement reports comprise Reference Signal Received Power (RSRP) values of the serving BS and one or more neighbor BSs;
determine occurrence of one or more handover event types based on the one or more measurement reports, a number of occurrences of each of the one or more handover event types within a predefined time period, and a consistency count for each of the one or more handover event types based on the number of occurrences of the one or more handover event types and RSRP values of at least one of the serving BS and the one or more neighbor BSs; and
perform a handover based on a comparison between the consistency count for each of the one or more handover event types and associated threshold consistency counts for the one or more handover event types.

8. The handover event analysis device of claim 7, wherein the occurrence of the one or more handover event types is determined based on a 3rd Generation Partnership Project (3GPP) specification.

9. The handover event analysis device of claim 7, wherein the consistency count for the one or more handover event types is determined based on at least one of a serving BS current RSRP value, the serving BS previous RSRP value, an event type RSRP difference hysteresis, and an event type RSRP difference threshold.

10. The handover event analysis device of claim 7, wherein the consistency count for the one or more handover event types is determined: based on at least one of one or more RSRP values of the one or more neighbor base stations, an RSRP value of the serving BS, an event type RSRP difference hysteresis, and an event type RSRP difference threshold; and when the number of occurrences of each of the one or more handover event types exceeds an associated threshold count.

11. The handover event analysis device of claim 7, wherein the processor coupled to the memory is further configured to be capable of executing at least one additional programmed instruction to determine a handover severity based on the comparison between the consistency count for each of the one or more handover event types and associated threshold consistency counts for the one or more handover event types.

12. The handover event analysis device of claim 7, wherein the processor coupled to the memory is further configured to be capable of executing at least one additional programmed instruction to: compute a weight factor for each of the one or more neighbor BSs based on a weighted sum of the consistency counts for each of the one or more handover event types associated with each of the one or more neighbor BSs; and identify a target neighbor BS for handover based on the weight factor associated with the one or more neighbor BSs.

13. A non-transitory computer readable medium having stored thereon instructions for managing a buffer cache comprising executable code which when executed by a processor, causes the processor to perform steps comprising:
receiving one or more measurement reports from one or more User Equipment (UE) associated with a serving base station (BS), wherein the one or more measurement reports comprise Reference Signal Received Power (RSRP) values of the serving BS and one or more neighbor BSs;
determining occurrence of one or more handover event types based on the one or more measurement reports, a number of occurrences of each of the one or more handover event types within a predefined time period, and a consistency count for each of the one or more handover event types based on the number of occurrences of the one or more handover event types and RSRP values of at least one of the serving BS and the one or more neighbor BSs; and
performing a handover based on a comparison between the consistency count for each of the one or more handover event types and one or more associated threshold consistency counts for the one or more handover event types.

14. The non-transitory computer readable medium of claim 13, wherein the occurrence of the one or more handover event types is determined based on a $3^{rd}$ Generation Partnership Project (3GPP) specification.

15. The non-transitory computer readable medium of claim 13, wherein the consistency count for the one or more handover event types is determined based on at least one of the serving BS current RSRP value, the serving BS previous RSRP value, an event type RSRP difference hysteresis, or an event type RSRP difference threshold.

16. The non-transitory computer readable medium of claim 13, wherein the consistency count for the one or more handover event types is determined:
    based on one or more RSRP values of the one or more neighbor base stations, an RSRP value of the serving BS, an event type RSRP difference hysteresis, and an event type RSRP difference threshold; and
    when the number of occurrences of each of the one or more handover event types exceeds an associated threshold count.

17. The non-transitory computer readable medium of claim 13, further having stored thereon at least one additional instruction comprising executable code which when executed by the processor, causes the processor to perform at least one additional step comprising determining a handover severity based on the comparison between the consistency count for each of the one or more handover event types and associated threshold consistency counts for the one or more handover event types.

18. The non-transitory computer readable medium of claim 13, further having stored thereon at least one additional instruction comprising executable code which when executed by the processor, causes the processor to perform at least one additional step comprising:
    computing a weight factor for each of the one or more neighbor BSs based on a weighted sum of the consistency counts for each of the one or more handover event types associated with each of the one or more neighbor BSs; and
    identifying a target neighbor BS for handover based on the weight factor associated with the one or more neighbor BSs.

* * * * *